United States Patent
Hayashi

(10) Patent No.: US 9,761,160 B2
(45) Date of Patent: Sep. 12, 2017

(54) IMAGE PROCESSING DEVICE, DISPLAY APPARATUS, IMAGE PROCESSING METHOD, AND PROGRAM

(71) Applicant: SEIKO EPSON CORPORATION, Tokyo (JP)

(72) Inventor: Tadashi Hayashi, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 168 days.

(21) Appl. No.: 14/725,554

(22) Filed: May 29, 2015

(65) Prior Publication Data

US 2015/0348516 A1 Dec. 3, 2015

(30) Foreign Application Priority Data

May 30, 2014 (JP) .................. 2014-112521

(51) Int. Cl.
| | |
|---|---|
| *G09G 5/393* | (2006.01) |
| *G09G 3/00* | (2006.01) |
| *G09G 5/391* | (2006.01) |
| *H04N 9/31* | (2006.01) |

(52) U.S. Cl.
CPC ............. *G09G 3/002* (2013.01); *G09G 5/391* (2013.01); *H04N 9/3185* (2013.01); *G09G 2380/10* (2013.01)

(58) Field of Classification Search
CPC .... G09G 3/002; G09G 5/391; G09G 2380/10; H04N 9/3185
See application file for complete search history.

(56) References Cited

U.S. PATENT DOCUMENTS

| | | | |
|---|---|---|---|
| 7,835,592 B2 | 11/2010 | McFadyen et al. | |
| 7,873,233 B2 | 1/2011 | Kadantseva et al. | |
| 8,300,061 B2 | 10/2012 | Hasegawa | |
| 2002/0196260 A1* | 12/2002 | Candler | G06T 1/60 345/531 |
| 2003/0107753 A1* | 6/2003 | Sakamoto | H04N 1/41 358/1.9 |
| 2003/0151625 A1* | 8/2003 | Shoemaker | G06T 3/0018 715/767 |
| 2006/0239357 A1* | 10/2006 | Bushell | H04N 19/46 375/240.23 |
| 2013/0069961 A1 | 3/2013 | Ota et al. | |

FOREIGN PATENT DOCUMENTS

| | | |
|---|---|---|
| JP | 2002-215114 A | 7/2002 |
| JP | 2008-102931 A | 5/2008 |
| JP | 2008-108251 A | 5/2008 |
| JP | 2010-087700 A | 4/2010 |
| JP | 2013-066134 A | 4/2013 |

* cited by examiner

*Primary Examiner* — Ke Xiao
*Assistant Examiner* — Kim-Thanh T Tran
(74) *Attorney, Agent, or Firm* — Oliff PLC

(57) ABSTRACT

An image processing device includes: a memory section that has memory areas equivalent to data of k rows of an image; a correction section that corrects data of a given pixel belonging to a row designated by a first counter, out of data stored in the memory section, using data of a pixel in a position designated by an offset vector corresponding to the given pixel; an output section that outputs data corrected by the correction section; and a write section that writes data, out of the image, of a row designated by the second counter into a corresponding memory area of the memory section.

11 Claims, 6 Drawing Sheets

IMAGE PROCESSING DEVICE, DISPLAY APPARATUS, IMAGE PROCESSING METHOD, AND PROGRAM

CROSS REFERENCE

The entire disclosure of Japanese Patent Application No. 2014-112521, filed May 30, 2014 is expressly incorporated by reference herein.

BACKGROUND

1. Technical Field

The present invention relates to a technology for correcting images.

2. Related Art

In a projector, when the positional relationship between a screen and a projection system is deviated from an ideal state, the image projected on the screen is distorted. To cancel out this distortion, image processing of imparting a distortion opposite to the existing distortion to the input image is used. This image processing requires random accessing to data of the input image. For this reason, in general, data of one frame of the input image is stored in a frame buffer (frame memory), and, using the data stored in the frame buffer, the image processing is performed. Using a frame buffer, however, a large-capacity memory is required, and this causes a problem of increasing the cost. To address this problem, a technique using a line buffer, not a frame buffer, is known (JP-A-2013-66134 (Patent Document 1)).

The technique described in Patent Document 1, in which a row including a pixel used for correction is selected and stored in a line buffer, has a problem that the load of the processing is large.

SUMMARY

An advantage of some aspects of the invention is providing an image processing technique where the processing load is more reduced.

According to a first aspect of the invention, an image processing device that processes an image displayed on a display section having pixels of r rows×c columns is provided. The device includes: a memory section that has memory areas equivalent to data of k rows of the image (k is a natural number satisfying Omax<k<r, where Omax is an offset maximum value previously set for the display section); a first counter memory section that stores a first counter designating a row serving as a reference of data read, out of the memory areas; a second counter memory section that stores a second counter designating a row serving as a reference of data write, out of the memory areas, and having a value obtained by adding a predetermined value to a value of the first counter; a correction section that corrects data of a given pixel belonging to the row designated by the first counter, out of data stored in the memory section, using data of a pixel that is in a position designated by an offset vector corresponding to the given pixel; an output section that outputs data corrected by the correction section; and a write section that writes data of the image of a row designated by the second counter into a corresponding memory area of the memory section.

According to the above image processing device, the processing can be reduced compared with the case of selecting a row including a pixel used for correction and writing the data into a line buffer.

A positive-direction offset maximum value and a negative-direction offset maximum value may be individually set for the display section, and the Omax may have either the positive-direction offset maximum value or the negative-direction offset maximum value whichever is larger.

According to the above image processing device, the correction can be performed more appropriately compared with the case that the memory section has memory areas of a number of rows smaller than the larger one of the positive-direction offset maximum value and the negative-direction offset maximum value.

The predetermined value may be larger than at least the positive-direction offset maximum value.

According to the above image processing device, the correction can be performed more appropriately compared with the case that the predetermined value is equal to or less than the positive-direction offset maximum value.

The correction section may perform the correction using data of pixels of m rows×n columns in a position designated by the offset vector, and $$(Omax+m/2)<k<r.$$

According to the above image processing device, the correction can be performed using pixels of m rows×n columns.

The correction section may perform the correction using data obtained by interpolating the data of pixels of m rows×n columns.

According to the above image processing device, the correction can be performed using data obtained by interpolating data of pixels of m rows×n columns.

According to a second aspect of the invention, a display apparatus is provided. The apparatus includes: a display section that has pixels of r rows×c columns and displays an image; a memory section that has memory areas equivalent to data of k rows of the image (k is a natural number satisfying Omax<k<r, where Omax is an offset maximum value previously set for the display section); a first counter memory section that stores a first counter designating a row serving as a reference of data read, out of the memory areas; a second counter memory section that stores a second counter designating a row serving as a reference of data write, out of the memory areas, and having a value obtained by adding a predetermined value to a value of the first counter; a correction section that corrects data of a given pixel belonging to the row designated by the first counter, out of data stored in the memory section, using data of a pixel that is in a position designated by an offset vector corresponding to the given pixel; an output section that outputs data corrected by the correction section; and a write section that writes data of the image of a row designated by the second counter into a corresponding memory area of the memory section.

According to the above display apparatus, the processing can be reduced compared with the case of selecting a row including a pixel used for correction and writing the data into a line buffer.

According to a third aspect of the invention, an image processing method for a display apparatus is provided, the apparatus including a display section that has pixels of r rows×c columns, a memory section that has memory areas equivalent to data of k rows of the image (k is a natural number satisfying Omax<k<r, where Omax is an offset maximum value previously set for the display section), a first counter memory section that stores a first counter designating a row serving as a reference of data read, out of the memory areas, and a second counter memory section that stores a second counter designating a row serving as a reference of data write, out of the memory areas, and having a value obtained by adding a predetermined value to a value of the first counter. The method includes: correcting data of a given pixel belonging to the row designated by the first counter, out of data stored in the memory section, using data of a pixel that is in a position designated by an offset vector corresponding to the given pixel; outputting the corrected data; and writing data of the image of a row designated by the second counter into a corresponding memory area of the memory section.

According to the above image processing method, the processing can be reduced compared with the case of selecting a row including a pixel used for correction and writing the data into a line buffer.

According to a fourth aspect of the invention, a program is provided. The program makes a computer, which has a display section that has pixels of r rows×c columns, a memory section that has memory areas equivalent to data of k rows of the image (k is a natural number satisfying Omax<k<r, where Omax is an offset maximum value previously set for the display section), a first counter memory section that stores a first counter designating a row serving as a reference of data read, out of the memory areas, and a second counter memory section that stores a second counter designating a row serving as a reference of data write, out of the memory areas, and having a value obtained by adding a predetermined value to a value of the first counter, execute: correcting data of a given pixel belonging to the row designated by the first counter, out of data stored in the memory section, using data of a pixel that is in a position designated by an offset vector corresponding to the given pixel; outputting the corrected data; and writing data of the image of a row designated by the second counter into a corresponding memory area of the memory section.

According to the above program, processing can be reduced compared with the case of selecting a row including a pixel used for correction and writing the data into a line buffer.

BRIEF DESCRIPTION OF THE DRAWINGS

The invention will be described with reference to the accompanying drawings, wherein like numbers reference like elements.

DESCRIPTION OF EXEMPLARY EMBODIMENTS

1. Configuration

Figure 1:
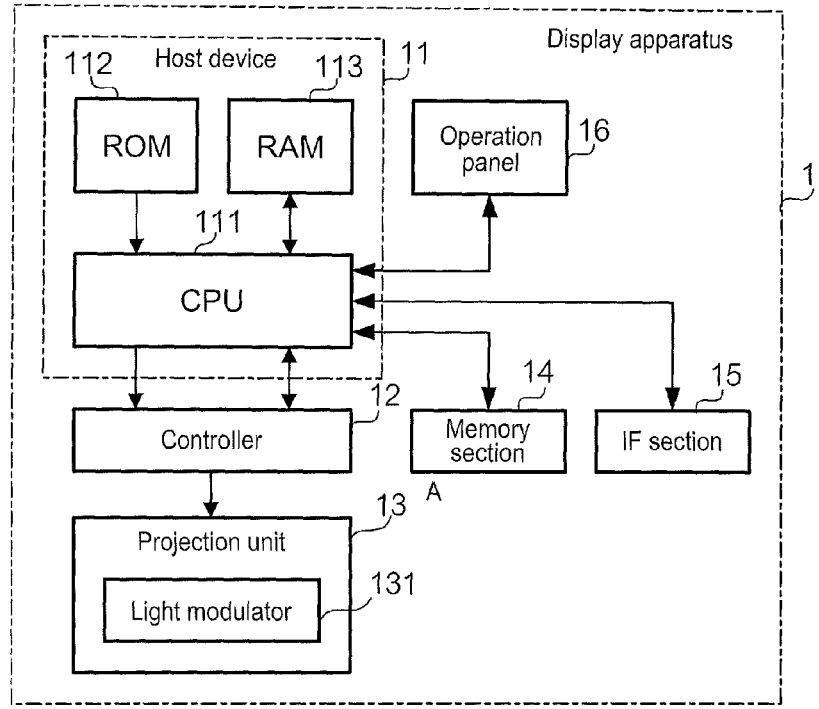
FIG. 1 is a block diagram showing a configuration of a display apparatus 1 according to an embodiment.

FIG. 1 is a block diagram showing a configuration of a display apparatus 1 according to an embodiment. The display apparatus 1 is a projective display apparatus that projects an image on a windshield of an automobile, a train, or a plane, for example, which is a so-called head-up display (HUD). When the display apparatus 1 is used for an automobile, the image projected is an image of a screen of a car navigation system or an image indicating measurement results of various instruments (e.g., a speedometer and a tachometer).

The display apparatus 1 has a host device 11, a controller 12, a projection unit 13, a memory section 14, an IF section 15, and an operation panel 16.

The host device 11, controlling the other components of the display apparatus 1, includes a central processing unit (CPU) 111, a read only memory (ROM) 112, and a random access memory (RAM) 113. The CPU 111 is a control device that controls the components of the display apparatus 1. The ROM 112 is a nonvolatile memory device that stores various programs and data. The RAM 113 is a volatile memory device that stores data, and functions as a work area when the CPU 111 executes processing.

The controller 12 is a device that controls the projection unit 13. In the illustrated example, the controller 12 functions as an image processing device that applies predetermined image processing to an input video signal. The controller 12 outputs the image-processed video signal to the projection unit 13.

The projection unit 13 projects an image on a screen in accordance with the image-processed video signal. The projection unit 13 has a light source, a light modulator 131, an optical system, and a drive circuit for these elements (illustration is omitted except for the light modulator 131). The light source may be a lamp such as a high-pressure mercury-vapor lamp, a halogen lamp, and a metal halide lamp, or a solid-state light source such as a light emitting diode (LED) and a laser diode. The light modulator 131 is a device that modulates light emitted from the light source in accordance with the video signal, and has a display section such as a liquid crystal panel and a digital mirror device (DMD), for example. The light modulator 131 has pixels of r rows and c columns, and modulates light for each pixel. The optical system is an element that projects the light modulated by the light modulator on the screen, and has a lens and a prism, for example.

The memory section 14 is a nonvolatile memory device that stores data and a program, such as a hard disk drive (HDD) and a solid-state drive (SSD). In the memory section 14, a program and map data for executing car navigation are stored. The host device 11 generates an image for car navigation using the program and data stored in the memory section 14 and outputs it to a subsequent circuit.

The IF section 15 is an interface that mediates transmission/reception of a signal or data to/from an external device (e.g. various instruments). The IF section 15 has a terminal through which the signal or data is transmitted/received to/from an external device.

The operation panel 16 is an input device via which the user inputs an instruction to the display apparatus 1, and includes a keyboard, a button, or a touch panel, for example.

Figure 2:
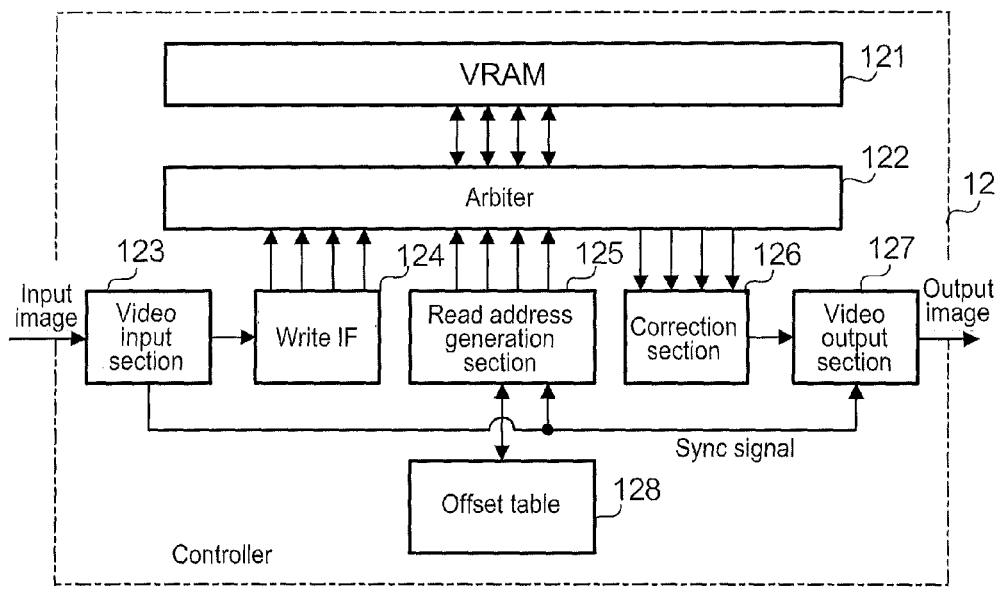
FIG. 2 is a view showing a configuration of a controller 12.

FIG. 2 is a view showing a configuration of the controller 12. The controller 12 has a video RAM (VRAM) 121, an arbiter 122, a video input section 123, a write IF 124, a read address generation section 125, a correction section 126, a video output section 127, and an offset table 128.

The VRAM 121 is a memory (memory section) having memory areas storing image data of k rows, in which k is a natural number satisfying $$Omax < k < r \tag{1}$$

where Omax is an offset maximum value previously set depending on the light modulator 131 used. The offset maximum value will be described later.

The VRAM 121 does not necessarily have memory areas of k rows×c columns. The VRAM 121 may have memory areas larger in number than k rows×c columns. In this case, part of the memory areas of the VRAM 121 may be divided into blocks and used. Although the VRAM 121 is included in the controller 12 in the example in FIG. 2, the VRAM 12 may be provided outside the controller 12.

The arbiter 122 is a circuit that arbitrates rights to access the VRAM 121. In this example, the VRAM 121 is divided into four banks, permitting simultaneous write or read of data to or from four addresses at maximum (for this reason, the input/output of the arbiter 122 is indicated by four arrows in FIG. 2).

The video input section 123 receives a video signal (input video signal) from the host device 11, and outputs the input video signal to the write IF 124.

The write IF 124 writes the input video signal into the VRAM 121 as data. At this time, the write IF 124 writes the data into a memory area, out of the memory areas of the VRAM 121, corresponding to a row designated by a write counter. The write counter is a parameter that designates the row for which data write is performed. The write IF 124 has a register (the second counter memory section) (not shown) for storing the write counter.

The read address generation section 125 generates an address indicating a memory area where data used for correction of data of a pixel to be processed is stored (such an address is hereinafter referred to as a "read address"). The read address generation section 125 generates the read address using a read counter and an offset vector. The read counter is a parameter designating a row that serves as the reference of data read. The read address generation section 125 has a register (the first counter memory section) (not shown) for storing the read counter. The offset vector is obtained from the offset table 128, which is a memory storing a table where offset vectors are recorded. The offset vector will be described later.

The correction section 126 performs data correction. The correction section 126 performs the correction using data stored in a memory area designated by an address generated by the read address generation section 125, out of the data stored in the VRAM 121. A concrete method of the correction will be described later.

The video output section 127 outputs the data corrected by the correction section 126 to the subsequent projection unit 13 as a video signal.

Although illustration is omitted, the controller 12 also has an interface that transmits/receives data and instructions to/from the host device 11.

2. Outline of Distortion Correction

Figure 3A:
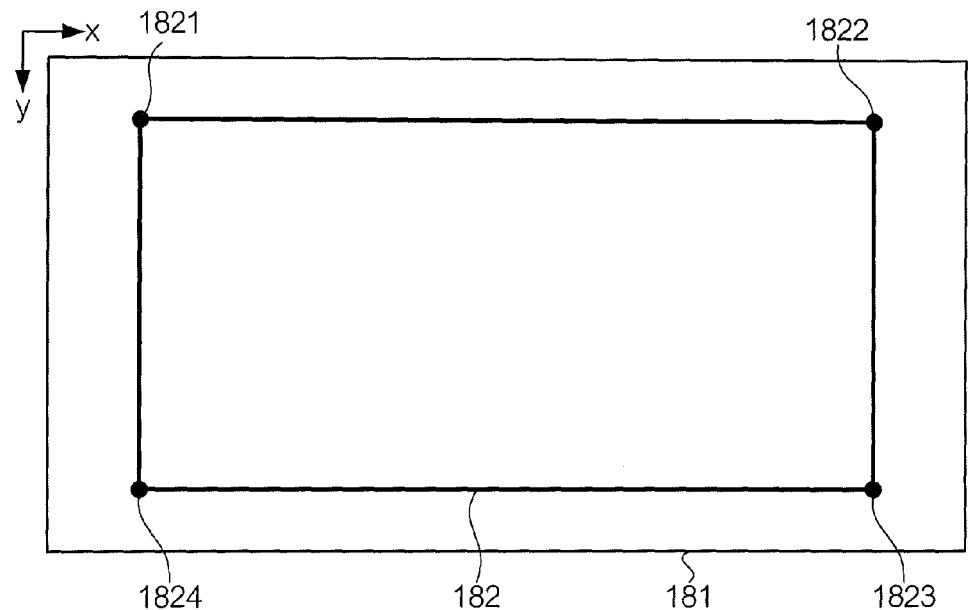
FIGS. 3A and 3B are views illustrating a distortion of an projected image.
Figure 3B:
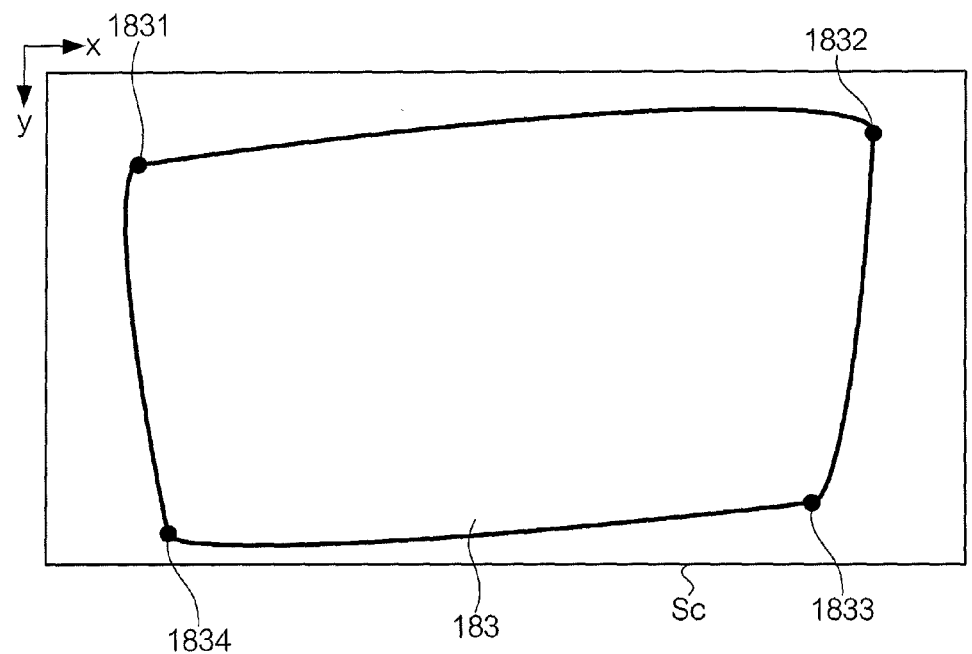

FIGS. 3A and 3B are views illustrating distortion of an image projected. FIG. 3A illustrates an image displayed on the light modulator 131, and FIG. 3B illustrates an image projected on a screen Sc. The light modulator 131 has a display area 181. In this example, a rectangle 182 is displayed on the display area 181. In response to the rectangle 182 displayed on the display area 181, a FIG. 183 is projected on the screen Sc. The FIG. 183 should be a rectangle if the positional relationship between the optical system of the projection unit 13 and the screen is ideal. In this example, however, since the positional relationship between the optical system and the screen is deviated from the ideal state, the FIG. 183 is distorted from a rectangle, but has points 1831, 1832, 1833, and 1834 corresponding to the vertexes of the rectangle 182. An outline of a method for solving this distortion will be described hereinafter.

Figure 4A:
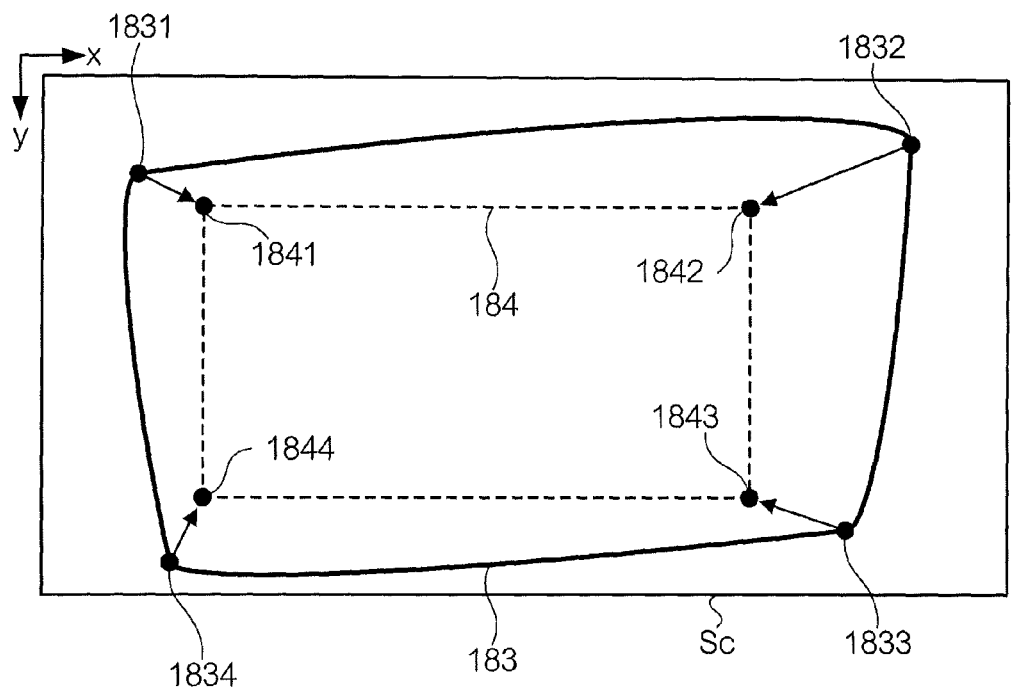
FIGS. 4A and 4B are views illustrating a FIG. 184 that is to be a post-correction target.
Figure 4B:
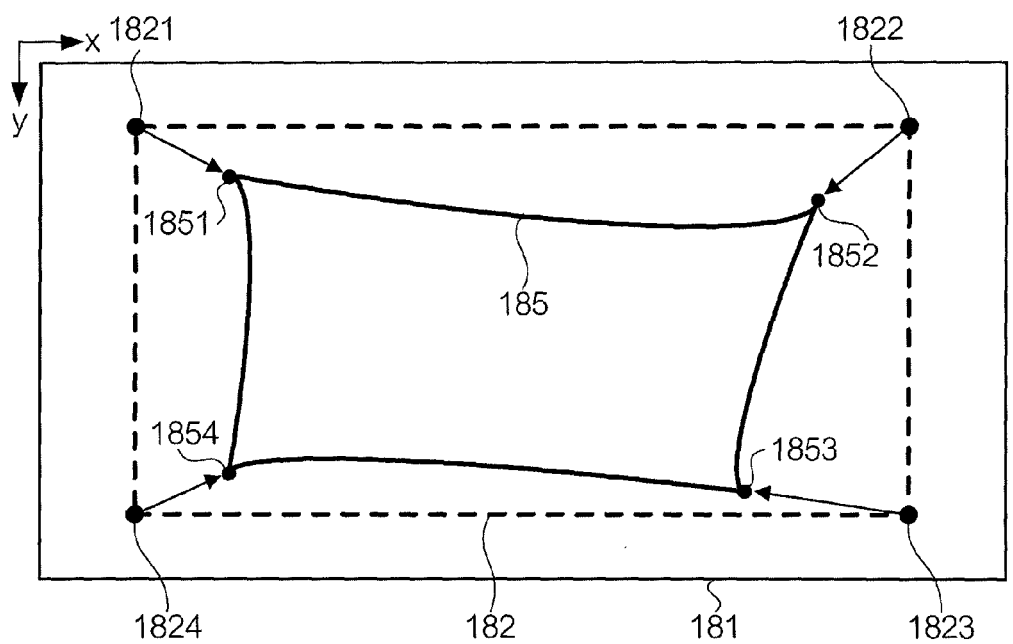

FIGS. 4A and 4B are views illustrating a FIG. 184 that is to be the post-correction target. FIG. 4A shows the FIG. 184 on the screen Sc. On the screen Sc, the FIG. 184 is a figure that satisfies the conditions that (i) it has sides in predetermined directions (e.g., the vertical direction and the horizontal direction), (ii) it has the same aspect ratio as the rectangle 182, and (iii) a reference position of the FIG. 184 and a reference position of the FIG. 183 are in a predetermined positional relationship (e.g., the center of gravity of the FIG. 184 corresponds with the center of gravity of the FIG. 183). The FIG. 184 has vertexes 1841, 1842, 1843, and 1844. It is preferable that the FIG. 184 further satisfy the condition that (iv) it is inscribed in the FIG. 183 from the standpoint of maximizing the area of a post-correction image. In the example of FIG. 4A, however, the condition (iv) is not satisfied to make the FIGS. 183 and 184 easy to discern.

To simplify the description, first, consider only the points 1831, 1832, 1833, and 1834 of the FIG. 183. To obtain the FIG. 184 as the post-correction shape, these points should be moved to the vertexes 1841, 1842, 1843, and 1844, respectively. That is, for the data (e.g., gradation value) of the post-correction vertex 1841, the data of the point 1831 should be referred to. Note herein that a vector indicating a pre-correction point to be referred to (e.g., the point 1831) with respect to a post-correction point (e.g., the vertex 1841) as the reference is referred to as an offset vector. Since the vertexes 1841, 1842, 1843, and 1844 respectively refer to the different points 1831, 1832, 1833, and 1834, the offset vector is defined at each of the points.

The above-described idea can be applied, not only to the vertexes of the FIG. 184, but also to all points (i.e., all pixels) on the display area 181. For example, when a grid pattern, not a mere rectangle, is projected, an offset vector can be defined using a deviation of each grid square.

The offset vectors are uniquely determined if only the positional relationship between the optical system of the projection unit 13 and the screen is determined. For example, the offset vectors can be determined by projecting a predetermined test pattern with the projection unit 13, shooting the projected image with a camera, and analyzing the image. In the case that the positional relationship between the projection unit 13 and the screen remains unchanged afterwards once the projection unit 13 is placed, as in the case of using the apparatus as a HUD of an automobile, the determined offset vectors may be stored in a memory to be referred to at the time of correction.

FIG. 4B shows a FIG. 185 on the light modulator 131. In this way, by displaying an image given a distortion opposite to that of the FIG. 183, the distortion-corrected FIG. 184 is displayed on the screen Sc.

The offset vector at a pixel P(x,y) on the display area 181 is herein represented by Vos(x,y). Post-correction data Dr(P) of the pixel P(x,y) is expressed as follows using pre-correction data Do.

$$Dr(P(x,y)) = Do(P(x,y) + Vos(x,y)) \tag{2}$$

Note that, while x and y of the pixel P(x,y) that is a real pixel are integers, the components of the offset vector Vos are not necessarily integers. When the components of the offset vector Vos are not integers, the position designated by the offset vector Vos is not a pixel itself but a point between pixels. In this case, post-correction data is obtained using data of a pixel closest to the position designated by the offset vector Vos. The relationship between the position designated by the offset vector Vos and the pixel used for correction is not limited to this. An example of other relationships will be described later.

The magnitude of the offset vector is referred to as the offset amount: the magnitudes of the offset vector in the x and y directions are referred to as the x-direction offset amount and the y-direction offset amount. The offset amount can assume either of a positive value and a negative value depending on the direction of the offset vector.

While the offset amount is determined with the positional relationship between the optical system and the screen, the range within which the offset amount can assume is limited to some extent when the apparatus is intended for a particular use, such as for automobiles. The maximum value of a presumed offset amount is referred to as the offset maximum value. Offset maximum values may be set individually for both the positive and negative directions, or a single offset maximum value may be set in common for both the positive and negative directions.

When offset maximum values are set individually for both the positive and negative directions with respect to the forward direction of the read counter, Omax in Expression (1) has either of these two values whichever is larger.

3. Operation

An example operation of the display apparatus 1 will be described hereinafter. In this example, assume that the light modulator 131 has a WVGA-equivalent resolution. That is, the light modulator 131 has pixels arranged in 480 rows and 800 columns (r=480, c=800). The offset maximum value is set to 120 (Omax=120). The VRAM 121 has memory areas for storing data of 241 rows. The 241 rows are based on the value obtained by doubling the offset maximum value (120 rows in this example) and adding the memory area for a pixel to be processed (1 row in this example) to the doubled value. The offset table 128 stores an offset vector for each pixel.

3-1. Outline

Figure 5:
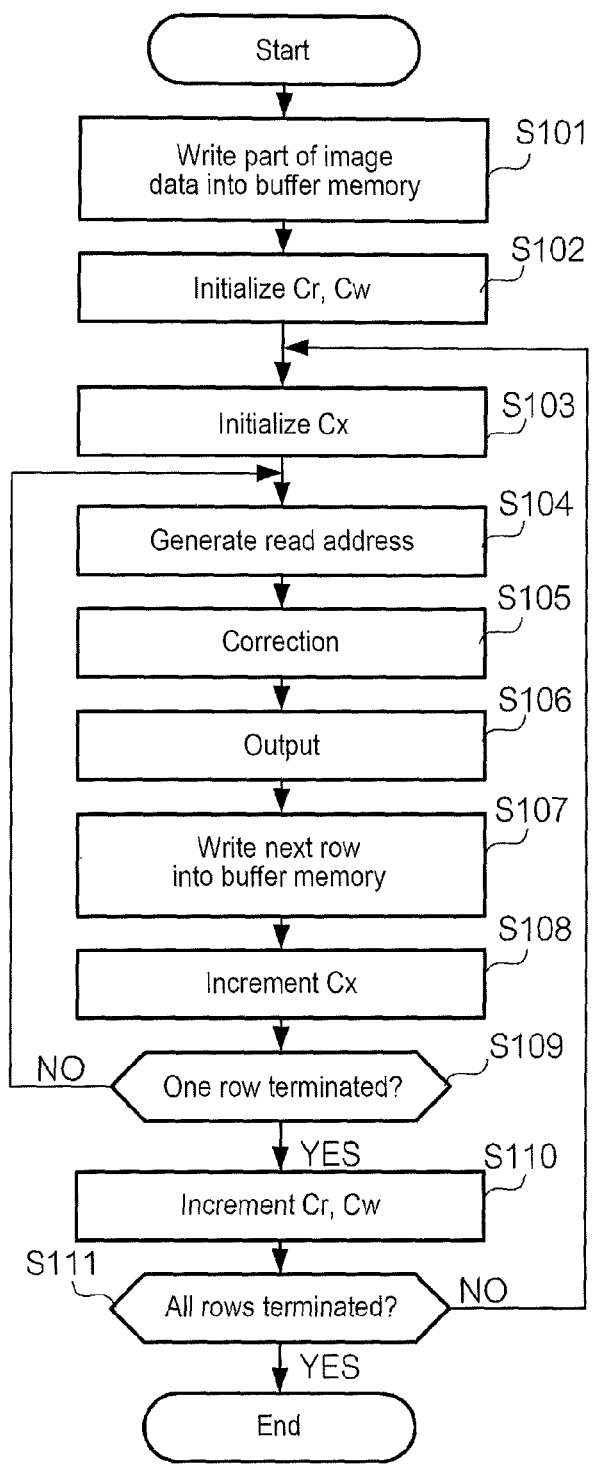
FIG. 5 is a flowchart showing an operation of the display apparatus 1.

FIG. 5 is a flowchart showing an operation of the display apparatus 1.

In step S101, the write IF 124 writes part of image data into the VRAM 121. The data written at this time is data of the number of rows equivalent to the offset maximum value, i.e., data of 120 rows in this example. That is, the write IF 124 writes data of the first to 120th rows of the image data into the VRAM 121.

The VRAM 121 has memory areas of the first to 241st rows. In step S101, the image data is written in the memory areas of the first to 120th rows.

In step S102, the read address generation section 125 and the write IF 124 initialize the read counter Cr and the write counter Cw, respectively. In this example, the counters are initialized to Cr=1 and Cw=Omax+Cr=121. The read counter Cr and the write counter Cw are counters indicating the positions of rows on the image data, which both assume values of 1 to 480 in this example. The difference between the write counter Cw and the read counter Cr is larger than at least the positive-direction offset maximum value.

In step S103, the read address generation section 125 and the correction section 126 initialize an x counter Cx, which is a parameter for specifying the pixel to be processed. The read address generation section 125 and the correction section 126 individually hold their x counters Cx, which are in synchronization with each other with a sync signal. In this example, the counters are initialized to Cx=1. The pixel to be corrected is hereinafter represented by a pixel Pc, which has coordinates (Cx,Cr).

In step S104, the read address generation section 125 generates a read address. The pixel designated by the read address, i.e., the pixel used for correction is represented by a pixel Pd, which has coordinates represented by Expression (3) below.

$$Pd=Pc+Vos \tag{3}$$

Data of the pixel Pd(xd,yd) is stored in a memory area of the kd-th row in the VRAM 121. The read address generation section 125 calculates the read address kd using Expression (4) below.

$$kd=yd(\bmod k) \tag{4}$$

For example, in the case that k=241, kd=yd when yd=1 to 241, and kd=2 when yd=243.

The read address generation section 125 outputs a data read request to the VRAM 121 via the arbiter 122. This read request includes an address designating a memory area of the kd-th row and the xd-th column. The VRAM 121 reads data from the memory area at the designated address and outputs the read data to the correction section 126 via the arbiter 122.

In step S105, the correction section 126 corrects the data of the pixel Pc using Expression (2).

Figure 6:
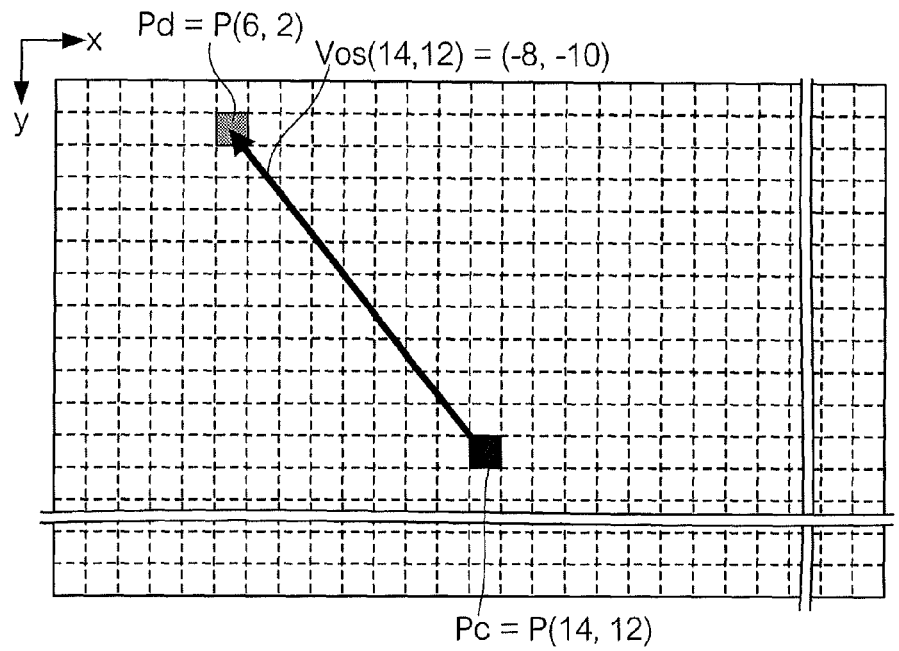
FIG. 6 is a view illustrating a pixel used for correction.

FIG. 6 is a view illustrating a pixel used for correction. In this example, Pc=P(14,12), and Vos(14,12)=(−8,−10). From Expression (3), the following is obtained.

$$Pd=(6,2) \tag{5}$$

Substituting the above in Expression (2), the following is obtained.

$$Dr(14,12)=Do(6,2) \tag{6}$$

Referring back to FIG. 5, in step S106, the video output section 127 outputs the data of the pixel Pc corrected by the correction section 126 to the subsequent circuit (e.g., the drive circuit of the light modulator 131).

In step S108, the read address generation section 125 and the correction section 126 increment their x counters Cx.

In step S109, the correction section 126 determines whether processing of one row has been completed, i.e., whether Cx=801. If it is determined that the processing of one row has not yet been completed (NO in S109), the correction section 126 shifts the processing to step S104. If it is determined that the processing of one row has been completed (YES in S109), the correction section 126 shifts the processing to step S109.

In step S109, the write IF 124 writes data of the row designated by the write counter Cw into the VRAM 121. The data of the row designated by the write counter Cw is written into a memory area of the kw-th row in the VRAM 121. The value kw is calculated by Expression (7) below.

$$kw=Cw(\bmod k) \tag{7}$$

For example, in the case that k=241, kw=Cw when Cw=1 to 241, and kw=2 when Cw=243.

In step S110, the read address generation section 125 and the write IF 124 increment the counters Cr and Cw.

In step S111, the read address generation section 125 determines whether the processing has been completed for all the rows, i.e., whether Cr=480. If it is determined that the processing has not yet been completed for all the rows (NO in S111), the read address generation section 125 shifts the processing to step S103. If it is determined that the processing has been completed for all the rows, the controller 12 terminates the processing in FIG. 5.

While an example of processing only one image (one frame) has been described, a plurality of frames of image may be processed continuously for processing of a moving image. For example, when Cw>r occurs during processing of the i-th frame, the write counter Cw may be initialized, and data of the (i+1)th frame may be written into the VRAM 121. In this case, when Cr>r occurs, the read counter Cr may be initialized, to start processing of the data of the (i+1)th frame.

As described above, according to this embodiment, the processing load can be reduced compared with the configuration where a row including a pixel used for correction is selected and stored in a line buffer. Also, since the read counter and the write counter count at the same speed, the read will never outpace the write (image data of which write has not yet been finished won't be read mistakenly).

Moreover, according to this embodiment, it is only necessary to place the controller 12 according to this embodiment between the host device 11 and the projection unit 13 (light modulator 131) for a configuration that is not according to the invention (a configuration that does not include the controller 12 in the example of FIG. 1). Thus, the function of correcting a distortion can be introduced to a system having no support for distortion correction easily at low cost.

3-2. Operation Example

A more concrete example of the operation will be described hereinafter.

Figure 7:
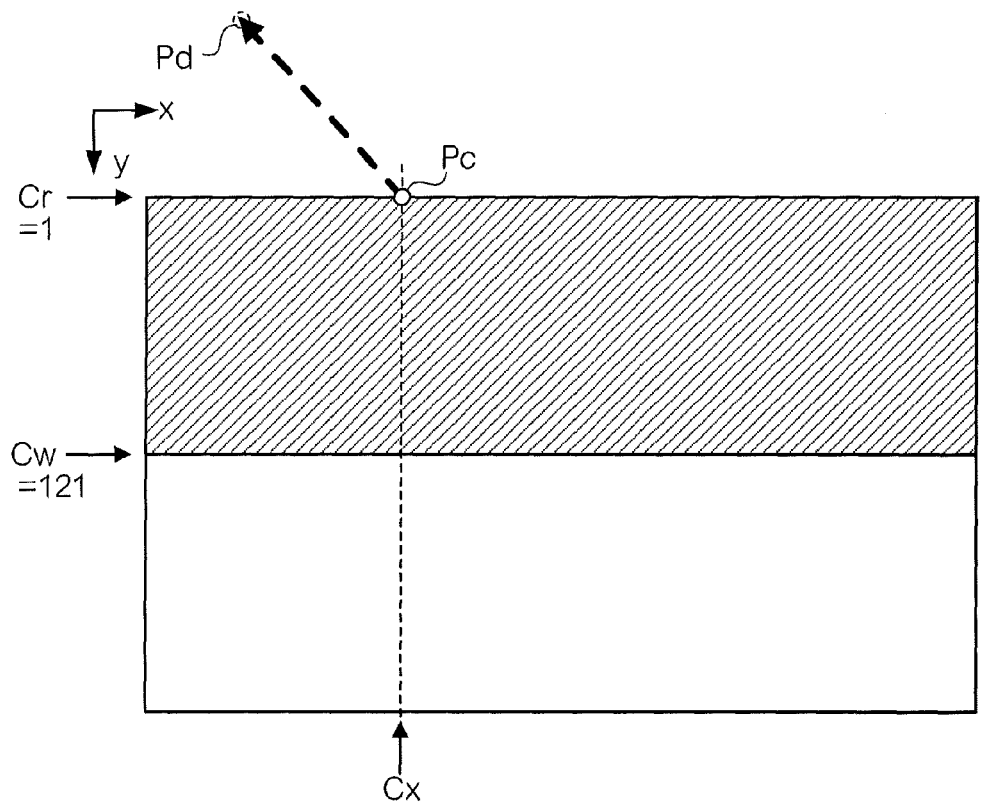
FIG. 7 is a view showing a state where Cr=1 and Cw=121.

FIG. 7 is a view showing a state where Cr=1 and Cw=121 (step S107), which is the state of the VRAM 121. The hatched portion indicates that data in the first to 120th rows is stored, and the non-hatched portion indicates that no data is stored (null values are stored).

In this example, both the x component and the y component of the offset vector Vos(Pc) are negative. That is, the pixel Pd is a pixel that does not exist in the original image data. In this case, the correction section 126 gives a predetermined value (e.g., a null value or a gray scale corresponding to black) as the post-correction data. In FIG. 7, Vos and Pd are represented by broken lines for the sake of convenience, indicating that a pixel nonexistent in the original image data is being referred to. When the pixel Pd is a pixel nonexistent in the original image data, the correction section 126 reads data of the predetermined value stored in its register (not shown), and uses the read data as the post-correction data.

Figure 8:
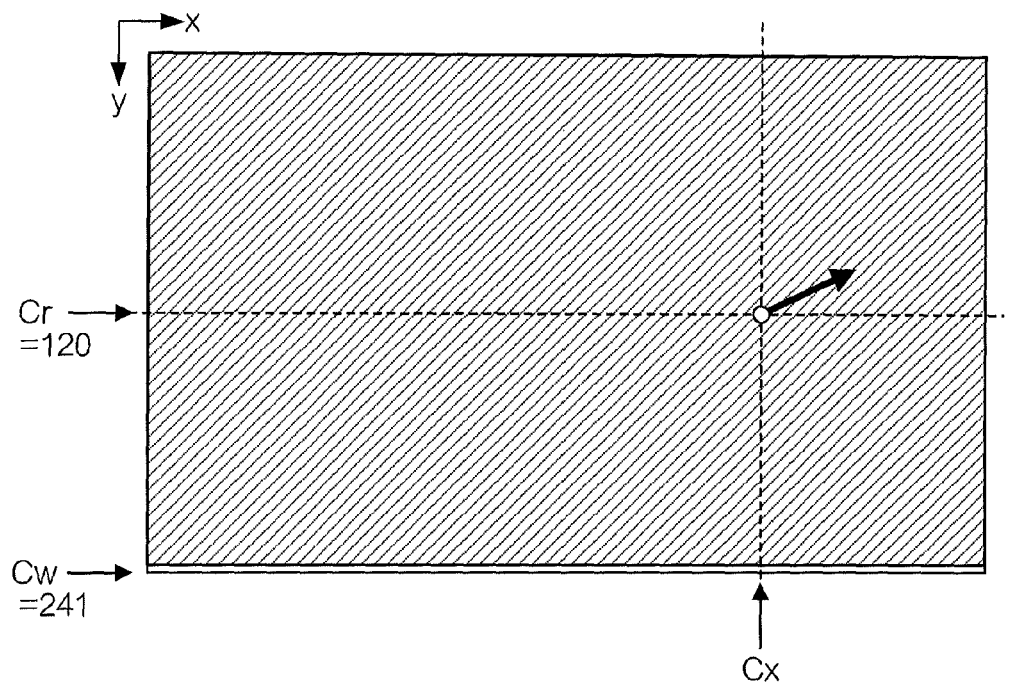
FIG. 8 is a view showing a state where Cr=120 and Cw=241.

FIG. 8 is a view showing a state where Cr=120 and Cw=241 (step S107). At this time, data of the first to 241st rows of the image is stored in the memory areas of the first to 241th rows of the VRAM 121. In this state, data equivalent to the maximum offset is stored in both the positive and negative sides of the forward direction (y direction) of the read counter Cr with respect to the row indicated by the read counter Cr. Therefore, irrespective of the y component of the offset vector Vos being positive or negative, and irrespective of the y component of the offset vector being the maximum offset value, the data of the pixel Pd is stored in the VRAM 121. In this case, the data of the pixel Pd can be read without the necessity of a calculation as that to be described in the next case in FIG. 9.

Figure 9:
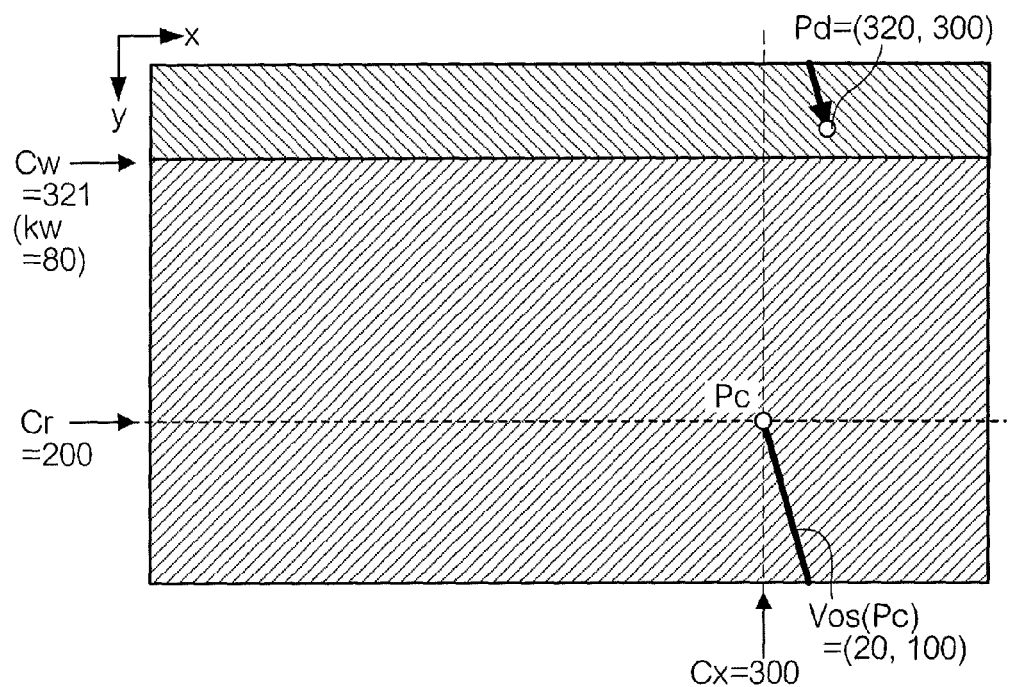
FIG. 9 is a view showing a state where Cr=200 and Cw=321.

FIG. 9 is a view showing a state where Cr=200 and Cw=321 (step S107). At this time, data of the 242nd to 321st rows of the image is stored in the memory areas of the first to 80th rows of the VRAM 121. Also, data of the 81st to 241st rows of the image is stored in the memory areas in the 81st to 241st rows of the VRAM 121. In this example, Pc=(300,200) and Vos(Pc)=(20,100). By substituting these into Expression (3), $$Pd=(320,300) \qquad (8)$$

is obtained. From Expression (4), $$kd=59. \qquad (9)$$

Therefore, the data of the pixel Pd is stored in the memory area of the 59th row of the VRAM 121. The VRAM 121 can store data of only 241 rows in the negative direction with respect to the counter forward direction from the row indicated by the write counter Cw at any time. When the y component of the offset vector Vos at the pixel Pc is larger than the number of rows of the remaining memory areas of the VRAM 121, i.e., when y>(k−kd), data of pixels of a row or rows exceeding the number of rows of the remaining memory areas of the VRAM 121 is stored in memory areas of the VRAM 121 starting from the first row in succession. Therefore, when the y coordinate of the pixel Pd is 300, the data is stored in the memory area of the 59th row of the VRAM 121. Note that, since the VRAM 121 has the same number of pixels as the light modulator 131 in the x direction, the x coordinate remains 320.

In the VRAM 121, data of the number of rows equivalent to the offset maximum value is stored in both the positive and negative directions with respect to the forward direction of the read counter, permitting read of data used for correction.

Also, while the configuration of the buffer memory is complicate in the technique in Patent Document 1, the frame buffer in this embodiment is simpler in configuration. Moreover, while only lens distortion is an object for correction in Patent Document 1, a distortion other than lens distortion can be corrected in this embodiment. Furthermore, while the circuit scale is large increasing the processing load in Patent Document 1, correction can be performed with more reduced processing load in this embodiment.

4. Variations

The present invention is not limited to the embodiment described above, but can be changed in various ways. Some of variations will be described hereinafter. Two or more of the following variations may be used in combination.

4-1. Variation 1

The offset vector Vos can be theoretically defined for all pixels P(x,y). However, when storing offset vectors of all pixels P(x,y) requires a large memory capacity, the offset vectors to be stored may be thinned. For example, offset vectors may be stored in the offset table 128 every two pixels in both the row and column directions. This results in storing offset vectors of only four corner pixels out of nine pixels of three rows×three columns. For the pixels of which offset vectors are not stored, the offset vectors of such pixels may be calculated by interpolation using offset vectors of adjacent pixels of which offset vectors are stored.

For example, when Vos(1,1)=(p1,q1) and Vos(1,3)=(p2, q2) are stored in the offset table 128, and Vos(1,2) is not stored in the offset table 128, Vos(1,2) is calculated by $$Vos(1,2)=\{Vos(1,1)+Vos(1,3)\}/2=[\{(p1+p2)/2\},\{(q1+q2)/2\}] \qquad (10)$$

4-2. Variation 2

The processing taken when a component of the offset vector Vos is not an integer is not limited to that described in the above embodiment. When a component of the offset vector Vos is not an integer, post-correction data may be obtained using data of a plurality of pixels (pixels of m rows×n columns) around the position designated by the offset vector Vos (e.g., by interpolation). In this case, k may satisfy Expression (11) below.

$$(O\max+m/2)<k<r \quad (11)$$

4-3. Variation 3

The memory capacity of the VRAM 121 is not limited to that described in the above embodiment. For example, when offset maximum values are set individually for the positive and negative directions with respect to the forward direction of the read counter, the VRAM 121 may have memory areas of the number of rows corresponding to the value obtained by summing the positive-direction offset maximum value, the negative-direction offset maximum value, and the memory area for the pixel to be processed. Concretely, when the positive-direction offset maximum value $O^+\max=120$, the negative-direction offset maximum value $O^-\max=80$, and the number of pixels to be processed is 1, the VRAM 121 may have memory areas of 201 (=120+80+1) rows. At this time, the value of the write counter Cw may be shifted by the negative-direction offset maximum value from the read counter Cr as in Expression (12) below.

$$Cw=Cr+O^-\max \quad (12)$$

4-4. Other Variations

The display apparatus 1 is not limited to the HUD, but may be a normal projector. In this case, the invention may be applied to keystone correction of the projector. In particular, the invention is effective for a small projector such as a so-called pico-projector.

The configurations of the display apparatus 1 and the components of the display apparatus 1 are not limited to those illustrated in FIGS. 1 and 2. While an example where hardware (the controller 12) executes the flow in FIG. 5 has been described in the above embodiment, the CPU 111 of the host device 11 may execute the flow in FIG. 5 in accordance with a program. In this case, the controller 12 may be omitted. Also, while an example where the read counter and the write counter are stored in registers of the read address generation section 125 and the write IF 124 has been described in the embodiment, these counters may be stored in another memory device such as the VRAM 121.

The program to be executed by the CPU 111 may be presented as being stored in a computer-readable recording medium such as a magnetic recording medium (a magnetic tape, a magnetic disk (a HDD and a flexible disk (FD)), etc.), an optical recording medium (an optical disk (a compact disk (CD) and a digital versatile disk (DVD)), etc.), a magneto-optical recording medium, and a semiconductor memory (a flash ROM, etc.). Otherwise, the program may be downloaded via a network such as the Internet.

The invention may be applied to electronic equipment other than the display apparatus, such as an imaging apparatus. For example, the invention may be applied to correction in a digital still camera, a digital video camera, and a drive recorder.

What is claimed is:

1. An image processing device that processes an image displayed on a display section having pixels of r rows×c columns, the device comprising:
a memory section that has memory areas equivalent to data of k rows of the image (k is a natural number satisfying Omax<k<r, where Omax is an offset maximum value previously set for the display section);
a write section that writes data, out of the image, of a write reference row of the memory areas serving as a reference of data write, into a corresponding memory area of the memory section;
a correction section that corrects data of a given pixel belonging to a read reference row obtained by adding a predetermined value to the write reference row, out of data stored in the memory section, using data of a pixel that is in a position designated by an offset vector corresponding to the given pixel; and
an output section that outputs data corrected by the correction section,
wherein the correction section performs the correction using data of pixels of m rows×n columns in a position designated by the offset vector, and $$(O\max+m/2)<k<r.$$

2. The image processing device according to claim 1, wherein a positive-direction offset maximum value and a negative-direction offset maximum value are individually set for the display section, and
the Omax has either the positive-direction offset maximum value or the negative-direction offset maximum value whichever is larger.

3. The image processing device according to claim 2, wherein the predetermined value is larger than at least the positive-direction offset maximum value.

4. The image processing device according to claim 1, wherein the correction section performs the correction using data obtained by interpolating the data of pixels of m rows×n columns.

5. A display apparatus comprising:
a display section that has pixels of r rows×c columns and displays an image;
a memory section that has memory areas equivalent to data of k rows of the image (k is a natural number satisfying Omax<k<r, where Omax is an offset maximum value previously set for the display section);
a first counter memory section that stores a first counter designating a row of the memory areas serving as a reference of data read;
a second counter memory section that stores a second counter designating a row of the memory areas serving as a reference of data write, and having a value obtained by adding a predetermined value to a value of the first counter;
a correction section that corrects data of a given pixel belonging to the row designated by the first counter, out of data stored in the memory section, using data of a pixel that is in a position designated by an offset vector corresponding to the given pixel;
an output section that outputs data corrected by the correction section; and
a write section that writes data of the image of a row designated by the second counter into a corresponding memory area of the memory section,
wherein the correction section performs the correction using data of pixels of m rows×n columns in a position designated by the offset vector, and $$(O\max+m/2)<k<r.$$

6. An image processing method for a display apparatus, the display apparatus including a display section that has pixels of r rows×c columns, a memory section that has memory areas equivalent to data of k rows of the image (k is a natural number satisfying Omax<k<r, where Omax is an offset maximum value previously set for the display section), a first counter memory section that stores a first counter designating a row of the memory areas serving as a reference of data read, and a second counter memory section that stores a second counter designating a row of the memory areas serving as a reference of data write, and having a value obtained by adding a predetermined value to a value of the first counter, the method comprising:
  correcting data of a given pixel belonging to the row designated by the first counter, out of data stored in the memory section, using data of a pixel that is in a position designated by an offset vector corresponding to the given pixel;
  outputting the corrected data; and
  writing data of the image of a row designated by the second counter into a corresponding memory area of the memory section,
  wherein the correcting data performs the correction using data of pixels of m rows×n columns in a position designated by the offset vector, and $$(O\max + m/2) < k < r.$$

7. An image processing device that processes an image displayed on a display having pixels of r rows×c columns, the device comprising:
  a memory that has memory areas equivalent to data of k rows of the image (k is a natural number satisfying Omax<k<r, where Omax is an offset maximum value previously set for the display section); and
  a hardware processor configured to:
  write data, out of the image, of a write reference row of the memory areas serving as a reference of data write, into a corresponding memory area of the memory;
  correct data of a given pixel belonging to a read reference row obtained by adding a predetermined value to the write reference row, out of data stored in the memory, using data of a pixel that is in a position designated by an offset vector corresponding to the given pixel; and
  output corrected data,
  wherein the hardware processor is configured to perform the correction using data of pixels of m rows×n columns in a position designated by the offset vector, and $$(O\max + m/2) < k < r.$$

8. The image processing device according to claim 7, wherein a positive-direction offset maximum value and a negative-direction offset maximum value are individually set for the display, and
  the Omax has a valve equal to a larger one of the positive-direction offset maximum value and the negative-direction offset maximum value.

9. The image processing device according to claim 8, wherein the predetermined value is larger than at least the positive-direction offset maximum value.

10. The image processing device according to claim 7, wherein the hardware processor is configured to perform the correction using data obtained by interpolating the data of pixels of m rows×n columns.

11. A display apparatus comprising:
  a display that has pixels of r rows×c columns and displays an image;
  a memory that has memory areas equivalent to data of k rows of the image (k is a natural number satisfying Omax<k<r, where Omax is an offset maximum value previously set for the display section);
  a first counter memory that stores a first counter designating a row of the memory areas serving as a reference of data read;
  a second counter memory that stores a second counter designating a row of the memory areas serving as a reference of data write, and having a value obtained by adding a predetermined value to a value of the first counter; and
  a hardware processor configured to:
  correct data of a given pixel belonging to the row designated by the first counter, out of data stored in the memory, using data of a pixel that is in a position designated by an offset vector corresponding to the given pixel;
  output corrected data; and
  write data of the image of a row designated by the second counter into a corresponding memory area of the memory,
  wherein the hardware processor is configured to perform the correction using data of pixels of m rows×n columns in a position designated by the offset vector, and $$(O\max + m/2) < k < r.$$

* * * * *